United States Patent [19]
Clerk

[11] 3,872,775
[45] Mar. 25, 1975

[54] SWASH-PLATE BEARINGS FOR AXIAL PISTON PUMPS OR MOTORS

[76] Inventor: Robert Cecil Clerk, Edison House, Fullerton Rd., Glenrothes, Fife, Scotland

[22] Filed: Sept. 25, 1973

[21] Appl. No.: 400,690

[52] U.S. Cl. .................................................. 91/486
[51] Int. Cl. ............................................. F01b 13/04
[58] Field of Search ............ 91/485, 489, 506, 486

[56] References Cited
UNITED STATES PATENTS

| | | | |
|---|---|---|---|
| 2,168,658 | 8/1939 | Thomas | 91/485 |
| 2,241,701 | 5/1941 | Doe | 91/485 |
| 2,871,798 | 2/1959 | Thoma | 91/489 |
| 3,635,126 | 1/1972 | Engel | 91/486 |
| 3,721,161 | 3/1973 | Bobst | 91/486 |
| 3,738,779 | 6/1973 | Hein | 91/506 |
| 3,739,692 | 6/1973 | Bell | 91/506 |

*Primary Examiner*—William L. Freeh
*Attorney, Agent, or Firm*—Imirie, Smiley & Linn

[57] ABSTRACT

The invention provides means to resist piston thrust of an axial piston rotary pump/motor as applied to a tiltable rotary swash plate. The said means comprises a ring of several hydrostatic thrust pads pressurised from the pump/motor working pressure via impedances and applying hydraulic pressure to an annular plate on the base of the swash plate.

4 Claims, 4 Drawing Figures

SWASH-PLATE BEARINGS FOR AXIAL PISTON PUMPS OR MOTORS

BACKGROUND OF THE INVENTION

This invention concerns improvements in bearings used in connection with the swash-plate of axial piston pump/motors.

In axial piston motors where the hydraulic pressure thrust on the pistons is converted into rotational torque by a swash-plate tilted at an angle to the rectilineal plane relative to the drive shaft (and conversely for pumps where shaft torque is converted to piston thrust and hydraulic pressure) there must of necessity be a thrust bearing (with journal capability) to support and accommodate the rotating piston assemblies relative to the stationary swash-plate carrier.

It is well known to use a hydrostatic pad or shoe bearing activiated by pump delivery pressure, but where the pump may be called upon to run for extended periods at zero or negligible pressure, and particularly where for this condition the drag horse-power losses assume any importance, this type of bearing is at a disadvantage.

It is well known also to use taper or parallel-stagger roller bearings for the swash-plate, but with these the losses at high rotation speed become significant.

It is also known to use ball thrust bearings which have a low drag loss but these are limited in their thrust capabilities both in respect of ball loading and by race pushover due to the thrust being applied over only 180° of the bearing circle.

SUMMARY OF THE INVENTION

It is an object of the present invention to provide a thrust bearing which has a low drag loss within its thrust capability, and which at high thrusts is assisted by hydrostatic augmentation.

To this end what I propose is an axial piston pump/motor, having a rotary swash-plate and a tiltable stationary swash-plate carrier, an annular bearing plate fitted to the underside of the said swash-plate, a series of axially floating hydrostatic bearing pads pressurised from pump/motor working pressure via impedances and capable of applying hydraulic pressure beneath the said plate.

A proportion of the said pads are preferably spring-pressed into tactile engagement with the plate to maintain a slight upward thrust thereon under conditions of minimum pump/motor working pressure.

Preferably also a further proportion of the said pads are spring-pressed out of tactile engagement with the said plate at low pump/motor working pressure to reduce bearing shear drag.

Preferably the working pressure is applied to the hydrostatic bearing pads through two screw threaded impedances arranged in series, one of which is incorporated in a fixing screw of each individual hydrostatic bearing pad.

According to a further feature of the invention the swash-plate carrier is formed with a part cylindrical lower surface and is supported in arcuate hydrostatic bearers permitting its tilting movement.

Tilting of the carrier is preferably carried out by the piston rods of hydraulic actuators controlled by programmed movement of a shuttle valve.

A constructional form of the invention is illustrated in the accompanying drawings.

DESCRIPTION OF THE PREFERRED EMBODIMENT

Figure 1:
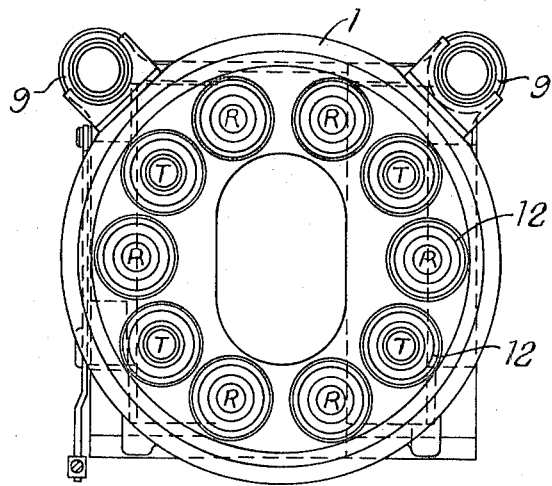
FIG. 1 is a plan view of a swash-plate carrier showing hydrostatic thrust pads according to the present invention.

Referring first to FIG. 1, a swash-plate carrier 1 is provided with a series of ten hydrostatic pressure pads 12, of which six are marked R and four are marked T.

The carrier is also provided with a pair of cup bearings 9 for the reception of the ends of piston rods of tilt-actuating cylinders hereinafter described.

Figure 2:
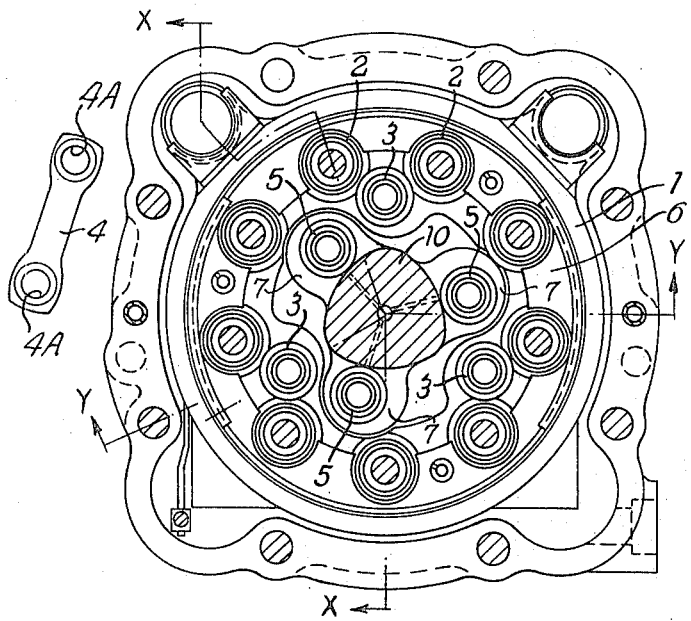
FIG. 2 is a horizontal section showing the carrier of FIG. 1 with the swash-plate mounted thereon.

Referring next to FIG. 2, a swash-plate 6 is shown mounted in the carrier 1. The swash-plate is provided with nine cup bearings 2 for the ends of piston rods of the pump/motor and three cup bearings 3 bearings 3 are connected to three similar bearings 5 in 3 radially extending arms 7 of the pump/motor main shaft 10 by a plurality of links 4 defining apertures 4A at each end thereof for reception of bearings 4B which extend through the respective cup bearings 3 and 5.

Figure 3:
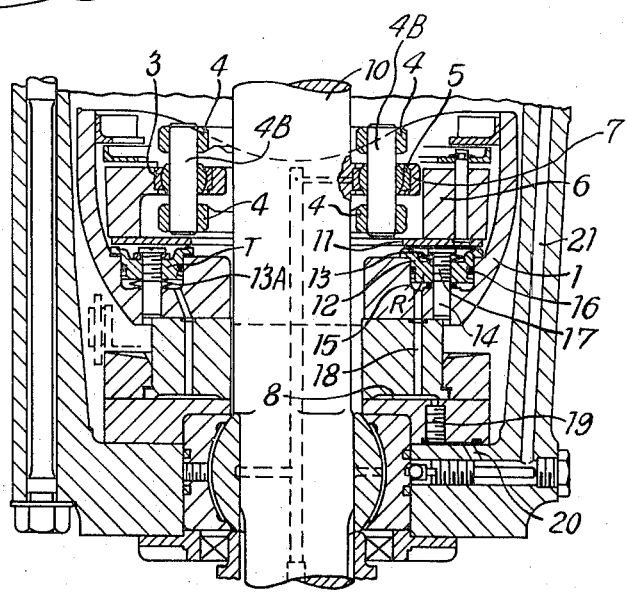
FIG. 3 is a section on the line Y—Y of FIG. 2.
Figure 4:
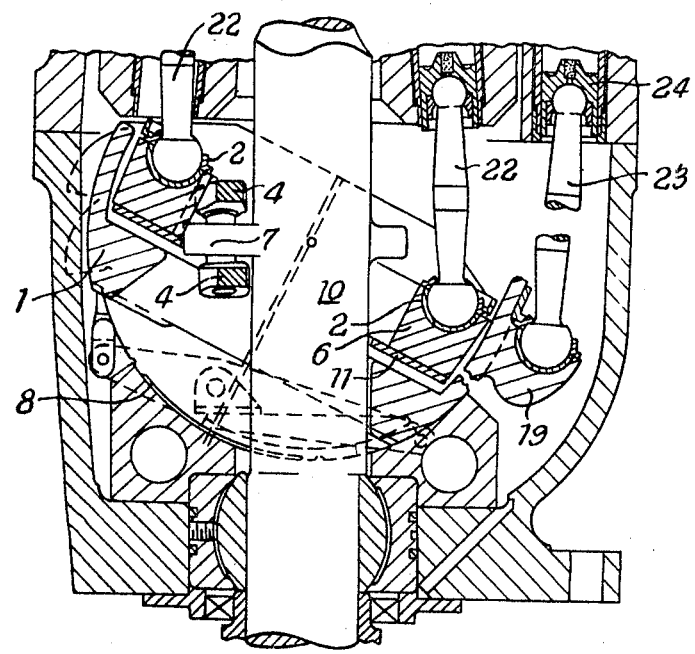
FIG. 4 is a section on the line X—X of FIG. 2.

Referring next to FIGS. 3 and 4, it will be seen that an annular bearing plate 11 is attached to the lower face of the swash-plate 6 and is subjected to hydraulic pressure from the pads 12.

The pads R are spring loaded away from contact with the plate 11 by disc springs 13, while the pads T are loaded into tactile engagement with the plate 11 by springs 13A.

The pads are located in cylindrical pockets 15 by pins 14 which include a threaded impedance section 17. O-rings 16 provide a seal between the pads and the pockets 15.

Hydraulic pressure derived from pump/motor working fluid pressure is fed to the pockets 15 through drillings 18 from hydrostatic arcuate rockers 8 against which the carrier 1 tilts.

The rockers 8 themselves are pressurised via a screw threaded impedance 19 fed through a port 20 from a supply conduit 21 connected to the pump/motor port gallery.

FIG. 4 shows the piston rods 22 of two of the nine working pistons of the pump/motor, and the piston rod 23 of one of the two tilt actuating pistons 24.

Thrust applied to the swash-plate 6 by the piston rods 22 is resisted by the disc springs 13A of the pads T at minimum pump/motor working pressure, while at higher pressures the pads R come into effective operation, while the thrust consequently applied by pressure in the pockets 15 to the carrier 1 is resisted by the hydrostatic arcuate rockers 8.

I claim:

1. In an axial piston pump/motor having a rotary swash-plate, a stationary swash-plate carrier tiltable about an axis, and a fluid pressure source, the improvement comprising a series of axially floating hydrostatic bearing pads disposed in said swash-plate carrier for supporting said swash-plate, said bearing pads being pressurized from pump/motor working pressure via impedances to apply hydraulic pressure beneath said swash-plate so as to balance forces experienced by said swash-plate during operation, a first group of said pads being biased into engagement with said swash-plate to maintain a slight upward thrust thereon under conditions of minimum pump/motor working pressure, and a second group of said pads being biased out of engagement with said swash-plate at low pump/motor working pressure to reduce shear drag, the pads of said first and second groups being disposed on both sides of a plane bisecting said carrier and normal to said tilt axis.

2. An axial piston pump/motor according to claim 1 wherein said first and second groups of pads are pressurized from a common source.

3. An axial piston pump/motor according to claim 1 wherein said first and second groups of pads are spring biased.

4. An axial piston pump/motor according to claim 1 wherein said first and second groups of pads are all pressurized toward said swash-plate.

* * * * *